US011098996B2

United States Patent
Lugani et al.

(10) Patent No.: US 11,098,996 B2
(45) Date of Patent: Aug. 24, 2021

(54) MAGNETIC POSITION SENSOR SYSTEM AND METHOD

(71) Applicant: Melexis Technologies SA, Bevaix (CH)

(72) Inventors: Lorenzo Lugani, Morges (CH); Thibault Marche, Woluwe Saint Lambert (BE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 39 days.

(21) Appl. No.: 16/553,341

(22) Filed: Aug. 28, 2019

(65) Prior Publication Data
US 2020/0072595 A1 Mar. 5, 2020

(30) Foreign Application Priority Data

Aug. 28, 2018 (EP) .................................... 18191222

(51) Int. Cl.
*G01R 33/00* (2006.01)
*G01B 7/14* (2006.01)

(52) U.S. Cl.
CPC ..................................... *G01B 7/14* (2013.01)

(58) Field of Classification Search
CPC G01R 33/00; G01R 33/0035; G01R 33/0023; G01R 33/0017; G01R 31/3191; G01B 7/004; G01B 7/14; G01C 17/38; G06F 3/017; G06F 3/0346; G06F 3/012
See application file for complete search history.

(56) References Cited

U.S. PATENT DOCUMENTS

| | | | |
|---|---|---|---|
| 9,057,629 B2 | 6/2015 | Hone et al. | |
| 2013/0027028 A1* | 1/2013 | Hohe | G01D 5/145 324/207.11 |
| 2015/0068341 A1* | 3/2015 | Andreasen | F16H 61/0403 74/473.11 |
| 2016/0161285 A1* | 6/2016 | Wu | G01D 5/145 324/207.12 |

FOREIGN PATENT DOCUMENTS

| | | | |
|---|---|---|---|
| DE | 19914352 A1 | 10/2000 | |
| DE | 102010003292 A1 | 9/2011 | |
| DE | 102015225902 A1 | 6/2017 | |
| WO | 2012025763 A1 | 3/2012 | |
| WO | WO-2012025763 A1 * | 3/2012 | .......... G01M 5/0033 |
| WO | 2013138942 A1 | 9/2013 | |
| WO | 2018122283 A1 | 7/2018 | |

OTHER PUBLICATIONS

Extended European Search Report from EP Application No. 18191222. 1, dated Feb. 5, 2019.

* cited by examiner

*Primary Examiner* — Patrick Assouad
*Assistant Examiner* — Taqi R Nasir
(74) *Attorney, Agent, or Firm* — Workman Nydegger

(57) ABSTRACT

A position sensor system for measuring a position of a target movable outside a plane, the system comprising: a first magnetic sensor and a second magnetic sensor fixedly arranged in the plane and spaced apart by a distance; the first respectively second magnetic sensor adapted for measuring at least one first respectively second in-plane magnetic field component in the plane to obtain at least a first respectively second value; a controller connected to the sensors for obtaining the values, and adapted for determining the out-of-plane position as a function of the values and of the predefined distance. A method is provided for determining the position.

12 Claims, 12 Drawing Sheets

MAGNETIC POSITION SENSOR SYSTEM AND METHOD

FIELD OF THE INVENTION

The present invention relates in general to the field of magnetic position sensor systems, and more in particular to a position sensor system for determining an out-of-plane position that is substantially insensitive to an external disturbance field. The present invention also relates to a computer implemented method of determining said linear position.

BACKGROUND OF THE INVENTION

Magnetic sensor systems, in particular linear position systems are known in the art. They offer the advantage of being able to measure a linear position without making physical contact, thus avoiding problems of mechanical wear, scratches, friction, etc.

There are basically two different types of linear position systems, depending on whether the distance between the sensor unit(s) and the movable object is constant, or changes as the object moves.

a) WO2018122283(A1) discloses a displacement sensor comprising two sensor units that are slidably arranged relative to a magnetic transducer. The two sensor units have a substantially constant distance relative to the magnetic transducer.

b) FIG. 1 of the present invention shows an existing linear position system where a magnet is movable towards and away from the sensor device.

The present invention is related to the second type of linear position sensor system, where the distance between the movable object and the sensor unit(s) varies as the object moves.

A disadvantage of the system of FIG. 1 is that it is sensitive to a magnetic disturbance field, which, when present, results in a position error.

SUMMARY OF THE INVENTION

It is an object of embodiments of the present invention, to provide a position sensor system that is less sensitive to a magnetic disturbance field, and to a method of determining a position.

It is an object of particular embodiments of the present invention, to provide a position sensor system that is less sensitive to a magnetic disturbance field and without significantly decreasing the S/N ratio of the signal, and to a method of determining a position.

It is an object of particular embodiments of the present invention, to provide a linear position sensor capable of measuring an out-of-plane position of an object which is movable towards and away from a plane.

These objectives are accomplished by a position sensor system and by a method for determining a position according to embodiments of the present invention.

According to a first aspect, the present invention provides a position sensor system for measuring a position of a target movable along a predefined trajectory outside a plane, the target being adapted for generating or modifying a magnetic field, the position sensor system comprising: a first magnetic sensor and a second magnetic sensor, both magnetic sensors fixedly arranged in said plane and spaced apart by a predefined distance; the first magnetic sensor adapted for measuring at least one first in-plane magnetic field component of said generated or modified magnetic field in said plane to obtain at least a first value; the second magnetic sensor adapted for measuring at least one second in-plane magnetic field component of said generated or modified magnetic field in said plane to obtain at least a second value; a controller communicatively connected to the first and the second magnetic sensor, and adapted for obtaining said at least first and second value, and adapted for determining the out-of-plane position of said target based on these values and on the predefined distance.

It is an advantage of this linear position sensor system that it allows to determine the out-of-plane position of the permanent magnet (or any object attached to said magnet) not based on an amplitude of the out-of-plane field component (Bz) as is typically done in the prior art, but on an in-plane field gradient of the sensors, because the latter is less sensitive to an external disturbance field.

In some embodiments, the first and second magnetic sensor are located on different dies in a single package (known as "multi-die single package. In some embodiments, the sensors are incorporated in different packages (e.g. two different ICs on a Printed Circuit Board). But the invention will also work if the sensors are located on one and the same substrate (e.g. single chip solution).

In an embodiment, the second magnetic sensor is distinct from the first magnetic sensor.

In this embodiment, typically the two sensors are implemented on two distinct (separate) semiconductor dies.

It is an advantage of using two separate magnetic sensors because in that way the distance between the two sensor devices is much larger as compared to a fully integrated solution. This allows the in-plane field gradients to be calculated with a larger signal-to-noise ratio (because at least the denominator in the formula dB/dx or dB/dy is significantly increased, for example by at least one order of magnitude).

These embodiments go against the common believe that integrating functionality on a single chip always means "more accurate results". This is not necessarily true for a system as described above, with an axially magnetized magnet located at a distance from the plane, where the nominator and the denominator of the gradient formulas dBx/dx and dBy/dy when measured on a single chip (having dimensions typically smaller than 1 mm) are both close to zero, resulting in large relative errors.

In an embodiment, the first magnetic sensor is adapted for measuring only one first magnetic field component in said plane to obtain a first value; and the second magnetic sensor is adapted for measuring only one second magnetic field component in said plane to obtain a second value.

In an embodiment, the controller is adapted for: a) determining at least one field gradient of the at least one in-plane field component; and b) determining the out-of-plane position as a function of said at least one determined in-plane field gradient.

It is an advantage of step a) that the gradient-calculation is related to the distance "D" which is relatively large as compared to a fully integrated solution.

It is an advantage of using this two-step approach, because step (a) results in a value which has a reduced sensitivity to an external disturbance field, and in that step (b) can easily be determined by design or by a calibration test.

In an embodiment, step a) comprises determining two field gradients in different directions and calculating a weighted average of these two field gradients, and step b)

comprises determining the out-of-plane position as a function of said weighted average.

In an embodiment, step a) comprises determining two field gradients in perpendicular directions, and calculating an average of these two field gradients, and step b) comprises determining the out-of-plane position as a function of said average.

In an embodiment, step b) comprises using a predefined lookup-table or using a predefined mathematical formula.

The predefined lookup-table may be a predefined table determined during design or during simulation, or can be measured during calibration, and stored in a non-volatile memory embedded in or connected to said controller.

It is noted that the dependence on the distance D can be incorporated in the values stored in the look-up table.

In an embodiment, the predefined trajectory is a straight line; and the position sensor system is a linear position sensor system.

Optionally, the straight line and the plane define an angle in the range from 45° to 135°, or from 80° to 100°.

In an embodiment, the straight line is substantially perpendicular to said plane.

In an embodiment, the target is an axially magnetized permanent magnet; and the axial magnetization direction is substantially parallel with the straight line.

In an embodiment, the target is a ferromagnetic object with a predefined size and shape.

In an embodiment, the target is a permanent magnet, for example a cylindrical magnet or a block magnet, or a bar magnet or a disk-shaped magnet, or a ring-shaped magnet.

In an embodiment, the permanent magnet is an axially magnetized cylindrical magnet, or an axially magnetized bar magnet, or an axially magnetized disk magnet, or an axially magnetized ring magnet.

In an embodiment, the permanent magnet has a shape with a circular cross section with an outer diameter in the range from 4 to 20 mm, e.g. equal to about 5 mm or about 8 mm or about 12 mm or about 15 mm or about 18 mm, or about 20 mm, and the ratio of the distance "D" between the sensors and the outer diameter of the magnet is a value in the range from 50% to 100%, or from 60% to 100%, or from 70% to 100%, or from 80% to 100%, or from 90% to 100%.

The axial magnetization may be substantially parallel with said straight line along which the target is movable.

In an embodiment, the predefined distance is a value in the range from 5 mm to 50 mm, or from 5 mm to 30 mm, or from 8 mm to 30 mm.

In an embodiment, the first magnetic sensor is a first packaged semiconductor device and the second magnetic sensor is a second packaged semiconductor device different from the first packaged semiconductor device and the first and second sensor device are mounted on a printed circuit board defining said plane.

In an embodiment, the predefined trajectory is a straight line substantially perpendicular to said plane; and the first magnetic sensor is adapted for determining only one magnetic field component along a first internal axis; and the second magnetic sensor is adapted for determining only one magnetic field component along a third internal axis; and the first internal axis and the third internal axis substantially coincide; and an intersection point of the straight line and the plane is located substantially halfway between the first magnetic sensor and the second magnetic sensor; and the controller is adapted for calculating the out-of-plane position of the movable target based on the value, for example using a look-up table.

It is an advantage that this system provides an elegant solution for determining an out-of-plane position, with a reduced sensitivity to an external stray field, with a relative high signal-to-noise ratio (by choosing an appropriate D) and requiring only very simple arithmetic.

It is an advantage of this system that it is highly insensitive to position errors of the movement axis, thus mounting requirements can be reduced.

In an embodiment, the position sensor system further comprises a third magnetic sensor and a fourth magnetic sensor; and the third magnetic sensor is adapted for determining only one magnetic field component along a fifth internal axis; and the fourth magnetic sensor is adapted for determining only one magnetic field component along a sixth internal axis; and the fifth internal axis and the sixth internal axis substantially coincide and are perpendicular to the first internal axis; and said intersection point is located substantially halfway between the third magnetic sensor and the fourth magnetic sensor; and the controller is operatively connected to the third and fourth sensor, and is adapted for calculating the out-of-plane position of the movable target as a function of the four values and the distance D, for example using a look-up table.

In an embodiment, the predefined trajectory is a straight line substantially perpendicular to said plane; and the first magnetic sensor is adapted for determining a first pair of magnetic field components along a first internal axis and a second internal axis perpendicular to the first internal axis; and the second magnetic sensor is adapted for determining a second pair of magnetic field components along a third internal axis and a fourth internal axis perpendicular to the third internal axis; and the first internal axis and the third internal axis are substantially parallel; and an intersection point of the straight line and the plane is located substantially halfway between the first magnetic sensor and the second magnetic sensor; and the intersection point is located on a bisector of the angle formed by the first internal axis and the second internal axis; and the intersection point is located on a bisector of the angle formed by the third internal axis and the fourth internal axis; and the controller is adapted for calculating the out-of-plane position of the movable target as a function of the value, for example using a look-up table.

It is an advantage that this system provides an elegant solution for determining an out-of-plane position, with a reduced sensitivity to an external stray field, with a relative high signal-to-noise ratio (by choosing an appropriate D) and requiring only very simple arithmetic.

It is an additional advantage that this system allows to detect errors in the sensors, because the value of (Bu1−Bu2+Bv1−Bv2) should be about equal to 2*(Bu1−Bu2) and also about equal to 2*(Bv1−Bv2). The skilled person can define an allowed deviation margin depending on the specific application.

It is an advantage that a sum/difference is made of four values, which typically further improves SNR.

In an embodiment, the position sensor system further comprises: a third magnetic sensor and a fourth magnetic sensor, both distinct from the first and second magnetic sensor, and fixedly arranged in said plane, and the fourth magnetic sensor is located at said predefined distance from the third magnetic sensor; and the third magnetic sensor is adapted for measuring at third pair of magnetic field components of said generated or modified magnetic field in said plane; and the fourth magnetic sensor is adapted for measuring a fourth pair of magnetic field components of said generated or modified magnetic field in said plane; and an intersection point of the straight line and the plane is located substantially halfway between the first magnetic sensor and the second magnetic sensor; and the intersection point is also located substantially on a bisector of the angle formed by the internal axes of the third magnetic sensor; and the intersection point is also located substantially on a bisector of the angle formed by the internal axes of the third magnetic sensor; and the controller is adapted for calculating the out-of-plane position of the movable target as a function of the values and the distance D, for example using a look-up table.

It is an advantage of this embodiment that if offers redundancy, because the out-of-plane distance can be determined twice. By comparing the two results (say Z1 and Z2), an error can be detected. If there is no error detected, the two results can be averaged so as to obtain a more accurate value.

According to a second aspect, the present invention also provides a computer implemented method for determining an out-of-plane position of the target of a position sensor system according to the first aspect, the method comprising the following steps: a) obtaining only one or at least one first value indicative of at least one in-plane field component from the first sensor; b) obtaining only one or at least one second value indicative of at least one in-plane field component from the second sensor; c) determining the out-of-plane position of said target based on these in-plane field components and on the distance between the sensors.

In an embodiment, step c) comprises determining the out-of-plane position as a function of a summation and/or subtraction of said values, using a predefined lookup-table and/or a predefined mathematical formula.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 6 is a schematic representation of a practical implementation of the system of FIG. 5 according to an embodiment of the present invention, where each sensor comprises four horizontal Hall elements and IMC, adapted for measuring two in-plane magnetic field components Bx and By.

FIG. 7 is a schematic representation of another practical implementation of the system of FIG. 5 according to another embodiment of the present invention, where each sensor comprises two vertical Hall elements, adapted for measuring two in-plane magnetic field components Bx and By.

FIG. 13 shows an axially magnetised disc and cylinder magnet.

FIG. 14 shows two axially magnetised ring magnets.

FIG. 15 shows an axially magnetised block magnet (also called bar magnet).

Figure 1A:
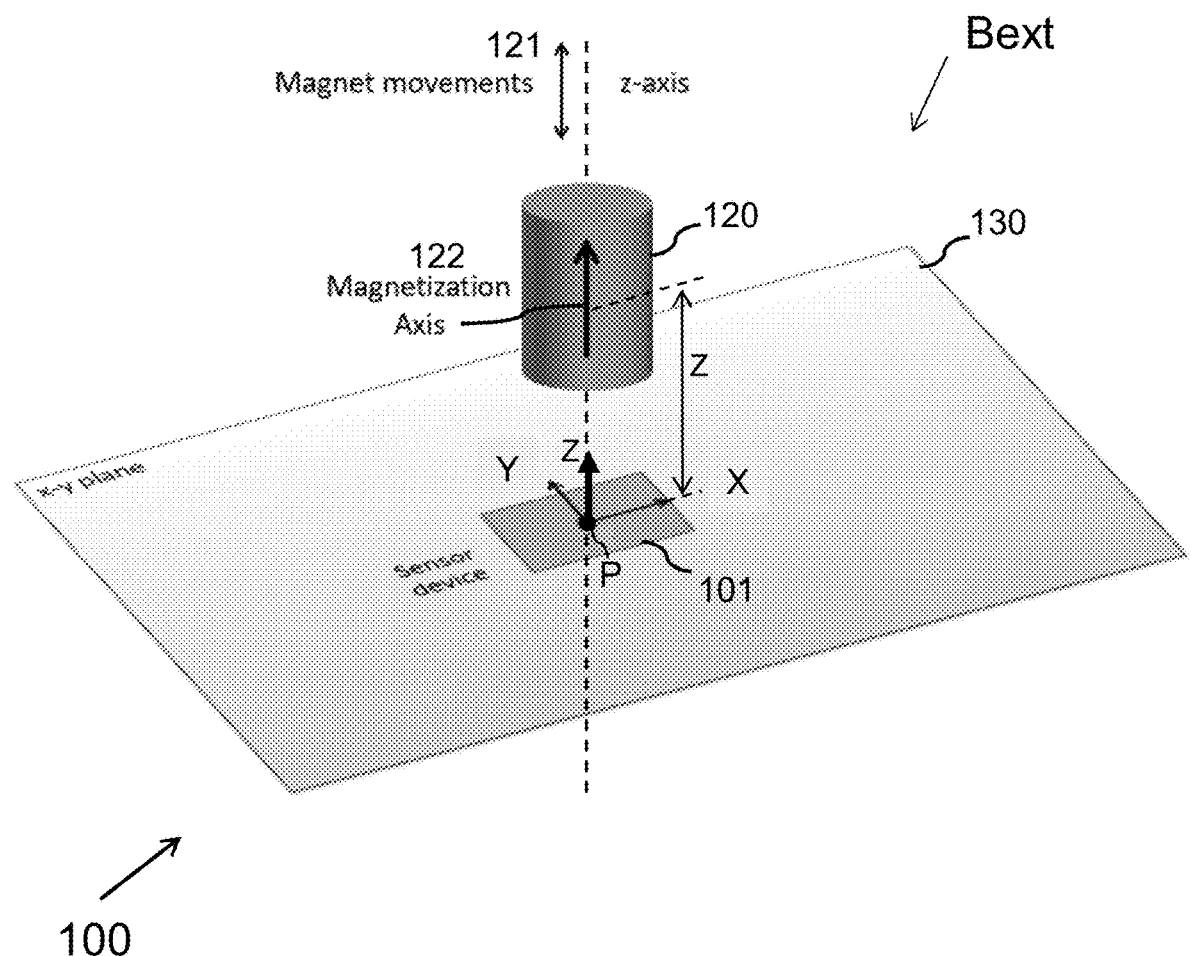
FIG. 1(a) is a perspective view on a linear positioning system known in the art, the system comprises a single sensor measuring a magnetic field component Bz perpendicular to the plane of the sensor.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "magnetic sensor" or "magnetic sensor device" refers to a magnetic sensor device comprising at least one magnetic "sensor element". The sensor or sensor device may be comprised in a package, also called "chip", but that is not absolutely required.

In this document, the term "sensor element" or "magnetic sensor element" refers to a component or a sub-circuit or a structure capable of measuring a magnetic quantity, such as for example a magneto-resistive element, a horizontal Hall plate, a vertical Hall plate, a Wheatstone-bridge containing at least one (but preferably four) magneto-resistive elements, etc.

In this document, the expression "in-plane components of a vector" and "X and Y component of a perpendicular projection of the vector in the plane" mean the same.

In this document, the expression "out-of-plane components of a vector" and "Z component of the vector" mean the same.

In this document, the expression "out-of-plane position" means a position outside of the plane containing the sensors, for example a position on an axis perpendicular to this plane, for example a distance from said plane.

As already described in the background section, FIG. 1(a) shows a linear position system known in the art, where an axially magnetised and cylindrical shaped permanent magnet 120 is movable towards and away from a magnetic sensor device 101. The sensor device 101 is adapted for measuring a magnetic field component perpendicular to the sensor plane (i.e. the so called Bz component) of the magnetic field generated by the magnet 120. The Bz component can for example be measured using a Horizontal Hall element.

The sensor device 101 typically comprises an excitation circuit, and a readout circuit, and an analog amplifier, and a digitizer or ADC, and a processing circuit for converting the digitized signal into a height position Z of the object, as is well known in the art, and therefore need not be explained in more detail here.

Figure 1B:
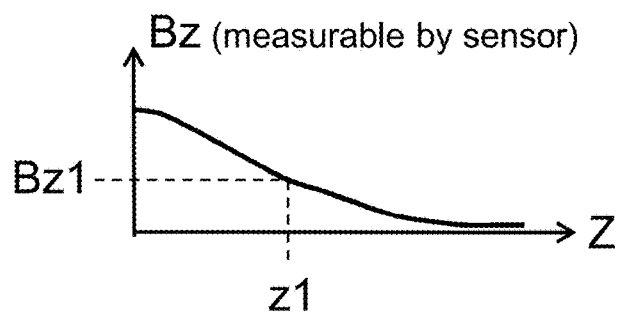
FIG. 1(b) shows how the magnitude value Bz measured by the sensor of FIG. 1(a) can be converted into a height position.

FIG. 1(b) shows a typical plot of the amplitude of the Bz field strength |Bz| as can be measured by the sensor 101, as a function of the out-of-plane position Z of the movable object, in the absence of an external disturbance field Bext. As can be seen, in the absence of a disturbance field Bext, each value of Bz corresponds 1-to-1 to a particular distance or Z-position, and it is an advantage of this system that the typical Bz-signal measured by the sensor is relatively large, for applications where the distance between the magnet and the plane is relatively small (e.g. smaller than 30 mm, or smaller than 20 mm, or smaller than 15 mm, or smaller than 10 mm, or in the range from 1 to 5 mm, or in the range from 1 to 10 mm, or in the range from 1 to 15 mm), e.g. in applications where the magnet is connected to a button which can be pushed.

However, if an external disturbance field is present, the measured value for Bz is that generated by the magnet plus that of the external field, which will usually not yield the correct position value z1, but another value lower or higher than z1. Thus, a disadvantage of the system of FIG. 1 is that it is sensitive to a magnetic disturbance field, which, when present, results in a position error, which is undesirable.

Desiring to make the system of FIG. 1 less sensitive to an external disturbance field, without significantly deteriorating the Signal-to-Noise ratio (SNR), the inventors came to the idea of providing:

a position sensor system (e.g. a linear position sensor system) for measuring a position (e.g. an out-of-plane position) of a target (e.g. a permanent magnet or a ferromagnetic object having a predefined size and shape) movable along a predefined trajectory (e.g. along a straight line or a bended curve) outside a plane, the target being adapted for generating or modifying a magnetic field (e.g. a locally generated magnetic field). The position sensor system comprises: a first magnetic sensor (e.g. in the form of a first semiconductor die or a first packaged IC), a second magnetic sensor (e.g. in the form of a second semiconductor die or a second packaged IC), and a controller (e.g. embedded in one of the sensors or a separate controller). The second magnetic sensor is distinct from the first magnetic sensor (e.g. implemented on another semiconductor die). Both sensors are fixedly arranged in said plane (e.g. two discrete dies in a single package, or two packaged ICs on a PCB) and spaced apart by a predefined distance "D" (e.g. in the range from 5 to 50 mm, or in the range from 10 to 30 mm). The first magnetic sensor is adapted for measuring only one or at least one first in-plane magnetic field component of said generated or modified magnetic field in said plane to obtain only one first value or at least a first value. The second magnetic sensor is adapted for measuring only one or at least one second in-plane magnetic field component of said generated or modified magnetic field in said plane to obtain at least a second value. The controller is communicatively connected to the first and the second magnetic sensor and is adapted for obtaining said at least first and second value, and is adapted for determining the out-of-plane position (e.g. Z position on a straight line) of said target based on these values and based on the predefined distance "D".

The present invention also provides a computer implemented method which can be executed by said controller, for determining said out-of-plane position of said target based on said at least two values.

While the present invention is not limited to systems with a permanent magnet as movable target, because for example a movable ferromagnetic object which influences a locally generated magnetic field will also work, the embodiments discussed further will only mention a permanent magnet for ease of the description. The present invention is however not limited thereto, but only by the claims.

Figure 2A:
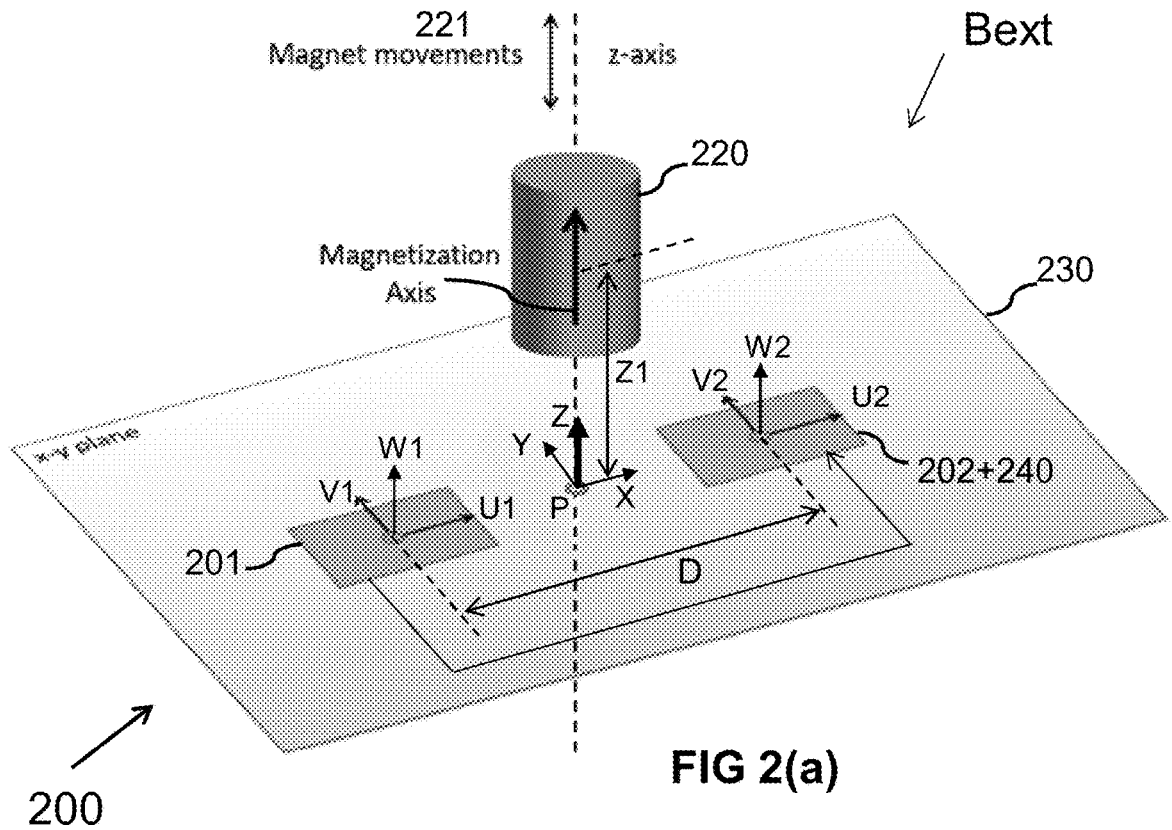
FIG. 2(a) is a perspective view of a first embodiment of the present invention, using two distinct magnetic sensors, spaced apart over a predefined distance D.

FIG. 2(a) is a perspective view of a first embodiment of the present invention, using two distinct magnetic sensors, spaced apart over a predefined distance D.

In the particular system 200 shown in FIG. 2, the predefined trajectory is a straight line 221 substantially perpendicular to said plane 230. The first magnetic sensor 201 is adapted for determining only one magnetic field component Bu1 along its first internal axis U1. The second magnetic sensor 202 is adapted for determining only one magnetic field component Bu2 along its internal axis U2 which substantially coincides with the axis U1 of the first sensor 201.

The magnet 220 is movable relative to the two sensors 201, 202 such that an intersection point P of the straight line 221 along which the magnet 220 can move and the plane 230 is located substantially halfway between the first magnetic sensor 201 and the second magnetic sensor 202.

The controller 240, which in the exemplary system 200 is embedded inside the second sensor 202, is adapted for calculating the out-of-plane position Z (e.g. the height) of the magnet 220 as a function of the values obtained from the sensors.

In this particular case, the first sensor 201 would provide a signal Bu1 (related to Bx field component measured at the first sensor location) and the second sensor 202 would provide a signal Bu2 (related to the Bx field component measured at the second sensor location), and the controller 240 would calculate an in-plane field-gradient using the following set of formulas, or an equivalent set of formulas:

$$\begin{cases} IPFG = (Bu1 - Bu2)/D & [1] \\ Z = f(IPFG) & [2] \end{cases}$$

where IPFG stands for "In plane field gradient", Bu1 is the value obtained from the first sensor indicative of the Bx field measured at the first sensor location, Bu2 is the value obtained from the second sensor indicative of the Bx field measured at the second sensor location, and D is the predefined distance between the first and second sensor, more specifically between magnetic centres of the first and second magnetic sensor.

The skilled person will recognize that the division by the distance "D" can be incorporated in the function "f", hence the position Z of the magnet can easily be calculated using the following simple formula:

$$Z = f(Bu1 - Bu2) \quad [3]$$

which can be implemented by a single subtraction and a look-up in a look-up table (and optionally an interpolation, in manners which are known per se in the art).

Figure 2B:
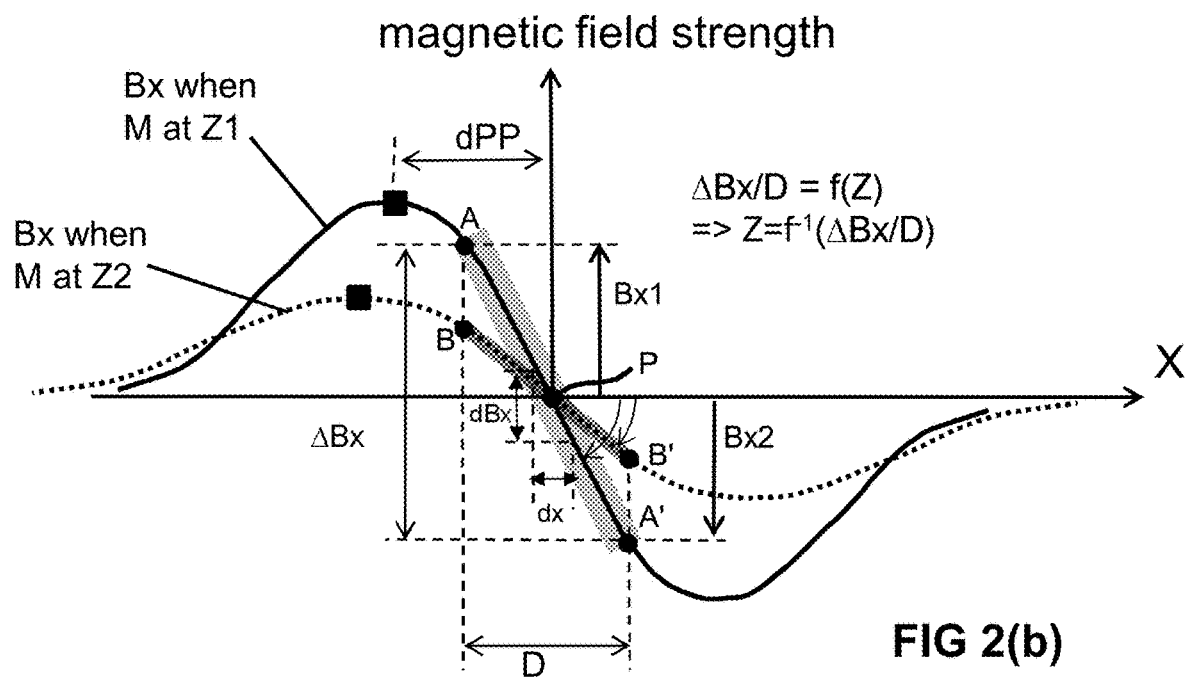
FIG. 2(b) shows a plot of the magnetic field components Bx and Bz measurable by two sensors for various positions on the X-axis as shown in FIG. 2(a) for two positions of the movable magnet, illustrating some of the underlying principles of the present invention.

FIG. 2(b) explains the rationale behind this formula.

Considering the plot for "Bx when M at Z1" showing the value Bu1 that would be measured by the first sensor for various positions along the X-axis assuming the magnet 220 is stationary at position Z1, the inventors observed that:

1) Observation1: the gradient dBx/dx is substantially constant in the vicinity of point P, but also relatively far away from point P (e.g. for distances up to about 50% or up to about 60% or up to about 70% or up to about 80% or up to about 90% or up to about 100% of the radius of the cylindrical magnet) hence the value of dBx/dx which could be measured by an integrated chip located at point P is substantially equal to the value ΔBx/D over a distance which is much larger, e.g. at least a factor of 5 or 10 larger, e.g. larger than the width of the silicon die that would be used by said integrated circuit (typically in the order of 1.0 to 2.0 mm). In practice this means that both the nominator and the denominator of the formula can be increased by a factor of about 5 to about 10, which considerably improves the SNR (Signal-to-Noise Ratio). This is one of the underlying principles of the present invention.

Figure 13:
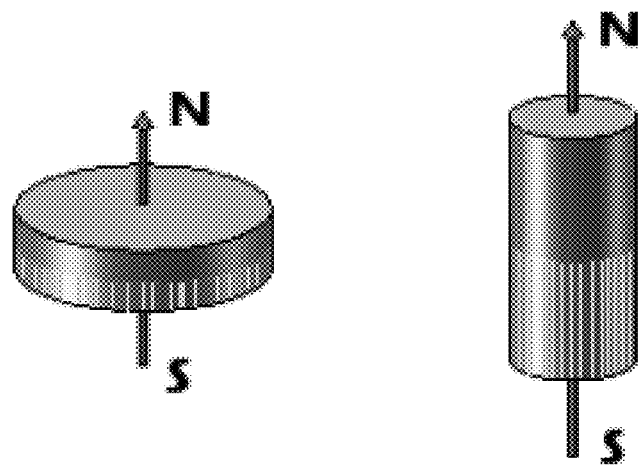
FIG. 13 to FIG. 15 show several exemplary axially magnetized magnets that can be used in embodiments of the present invention.
Figure 14:
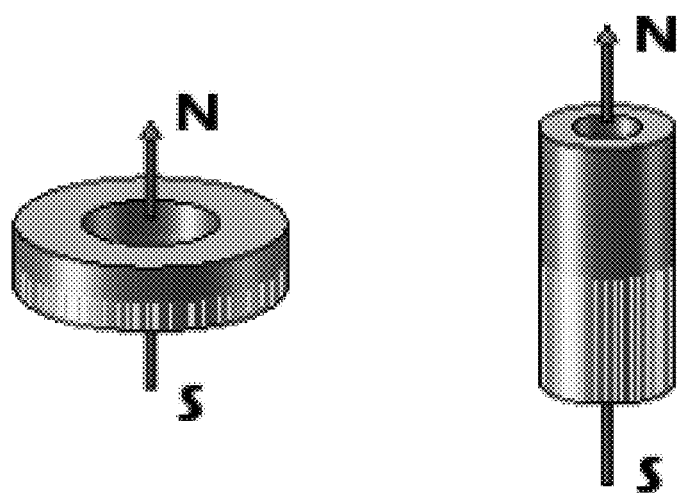
Figure 15:
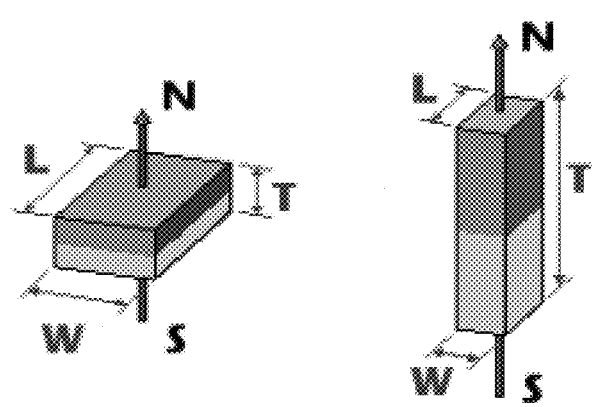

2) Observation2: the value Bx1 measured at a position on the left of point P is opposite to the value Bx2 measured at a position on the opposite side of P at the same distance or expressed mathematically: Bx1=−Bx2. This is true for the axially magnetized cylindrical magnet shown in FIG. 2a but is also true for other magnets (e.g. as shown in FIG. 13 to FIG. 15), without limiting the invention hereto, because axially magnetised magnets having a hexagonal or octagonal cross section for example, will also work.

3) Observation3: in the presence of an external disturbance field, sensor 1 measures a total field
value1~Btot1=(Bx1+Bext1), and sensor 2 would measure a total field value
value2~Btot2=(Bx2+Bext2), where "~" means "is proportional to".

4) Assuming that the external disturbance field is homogeneous, AND assuming that both sensors have substantially the same sensitivity, then the measured value Bext1=Bext2, and the value of the external field can be eliminated by subtracting the two values:

(value1−value2)=(Bx1+Bext1)−(Bx2+Bext2)=Bx1−Bx2, which ideally is also equal to 2*Bx1, but in practice usually is not, and does not need to be.

There is a common belief that it is not possible to have the same sensitivity in two distinct sensors, and it is true that the sensitivity of two distinct sensors is not exactly the same, but can be substantially the same if the two sensors are matched (e.g. same layout), and when using local temperature compensation. Moreover, the inventors realised that in this particular application, even if the external field is not 100% eliminated, if the signal Bx of the magnet is relatively large (which is the case if the sensors are located further apart, closer to the position on the X-axis corresponding to point "A", and assuming that the external disturbance field is relatively small compared to the local field of the magnet, the system 200 can actually work very well. Or stated in other words, the influence of the sensitivity mismatch between the two sensors is reduced by the enlarged distance D.

Considering the plot "Bx when M at Z2" showing the value Bu1 that would be measured by the first sensor for various positions along the X-axis assuming the magnet 220 is stationary at position Z2, the same observations (1) to (4) were made, but in addition it was observed that the slope of this plot is different from the slope of the plot of the curve Bx when the magnet was at Z1.

In other words, it was observed that the slope of the Bx-plots varies as the magnet is moved over the Z-axis. More specifically, the value ΔBx/D defined by the points A-A' is larger than the value ΔBx/D defined by the points B-B', and there is a 1-to-1 relationship between the slope and the Z-position of the magnet 220.

Thus, the external position Z of the magnet can be determined by measuring the value Bu1 and Bu2 at the two sensor locations, by calculating (Bu1−Bu2)/D, and by applying the inverse relation between the slope and the Z-position (not shown). As mentioned above, the actual division by the constant value D can be omitted and can be incorporated in the inverse function "f".

The skilled person can choose an appropriate distance "D" depending on the required accuracy of the particular system at hand, which may depend inter alia on the dimensions and shape of the movable object, the trajectory, how far the magnet or target is spaced from the plane, but also expected mounting tolerances, wear of the system, etc. In the example of FIG. 2(b) the skilled person would preferably choose as the distance D as a distance corresponding to point A or B which is located "before" the peak (as seen from the point P). The skilled person can for example choose D/2 as 50% to 100% of the distance "dPP" between the point P and the closest peak (on the different curves), or from 60% to 90% of this value, or from 70% to 90% of this value, e.g. about 80% of this value.

In practical implementations, the diameter of the axially magnetized cylindrical magnet 220 can for example be about 3 mm to about 20 mm, and its length can for example be in the range from 10% to 300% of the diameter. For example, disk or ring magnets may have a "thickness" of about 10% or about 20% of the outer diameter, while elongated cylindrical magnets or tubular ring magnets may have a length of about 2 times or 3 times the diameter.

In certain embodiments, the two sensors 201 202 are located outside of the projected diameter on the plane 230, although that is not absolutely required, and said projection may partially overlap the sensors.

The predefined distance D can for example be a value in the range from 5 mm to 50 mm, or from 5 mm to 30 mm.

In the specific example of FIG. 2, the predefined trajectory 221 along which the magnet 220 can move is a straight line, perpendicular to the plane 230, but that is not absolutely required, and the trajectory can also be a line which is tilted or inclined so as to define an angle in the range from 5° to 90° with the plane, preferably at least 10° or at least 20° or at least 30° or at least 45°. Such systems are called linear position sensor system.

But the present invention is not limited thereto, and can also be used to determine the position of the magnet (or target) on a curved line, as long as there is a 1-to-1 correspondence between the position Z of the magnet, and the in-plane field gradient (or the slope of the line segment of the Bx-curve of FIG. 2b).

In certain embodiments, the magnet is not perfectly axially magnetized, but the magnetization direction defines an angle in the range from about 30° to 90°. Also, this variant can be very well coped with, e.g. by choosing an appropriate function.

As can also be appreciated from FIG. 2(b), the slope ΔBx/D does not significantly change if the two sensors are spaced apart by a value slightly different from the predefined value D. This deviation can be fully compensated however when translating the slope to a position Z using calibrated data.

Figure 3:
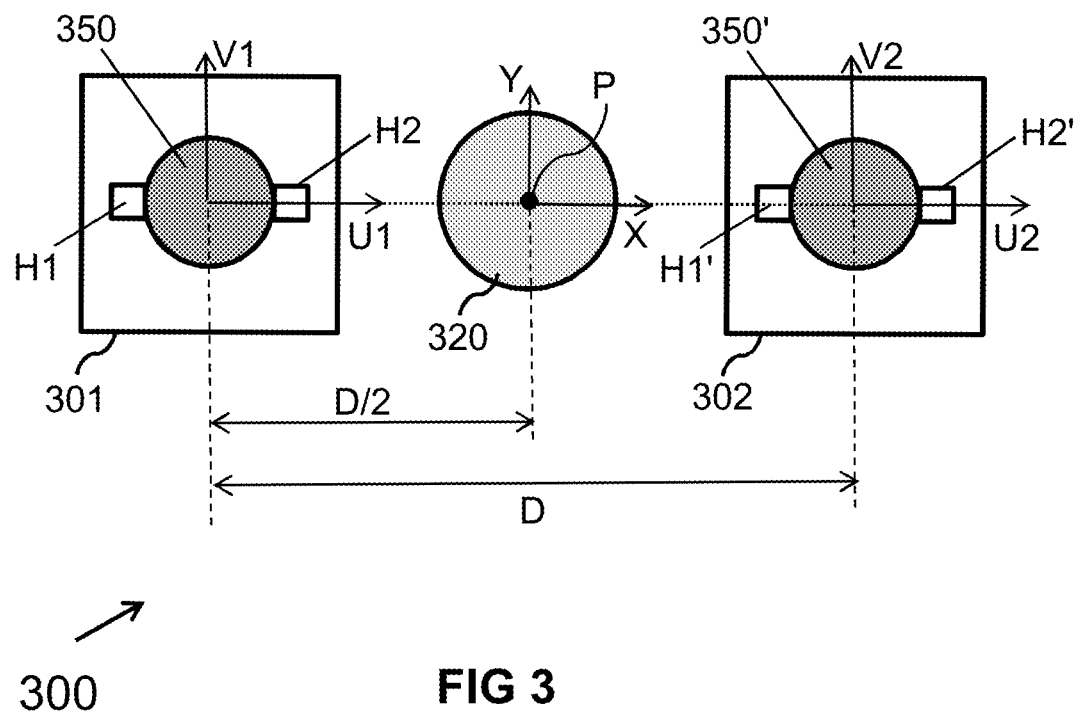
FIG. 3 is a schematic representation of a practical implementation of the system of FIG. 2 according to an embodiment of the present invention, where each sensor comprises two horizontal Hall elements and IMC, adapted for measuring the in-plane magnetic field Bx.

FIG. 3 is a schematic top-view of a possible implementation of a system 300 according to the system of FIG. 2. In the system 300, each sensor 301, 302 comprises two horizontal Hall elements arranged near the edge of a disk-shaped magnetic concentrator (also known as "IMC"). The principles of using horizontal Hall elements and IMC for measuring in-plane field components are well known in the art, (e.g. from US20020021124), and hence need not be described in more detail herein.

As can be seen, the first sensor 301 needs to measure only one field component value at the first sensor location (in this example: Bu1=Bx), and the second sensor 302 needs to measure the same field component (here: Bx) at the second sensor location. The controller, excitation circuitry, readout-circuitry, etc. is not shown in FIG. 3.

Figure 4:
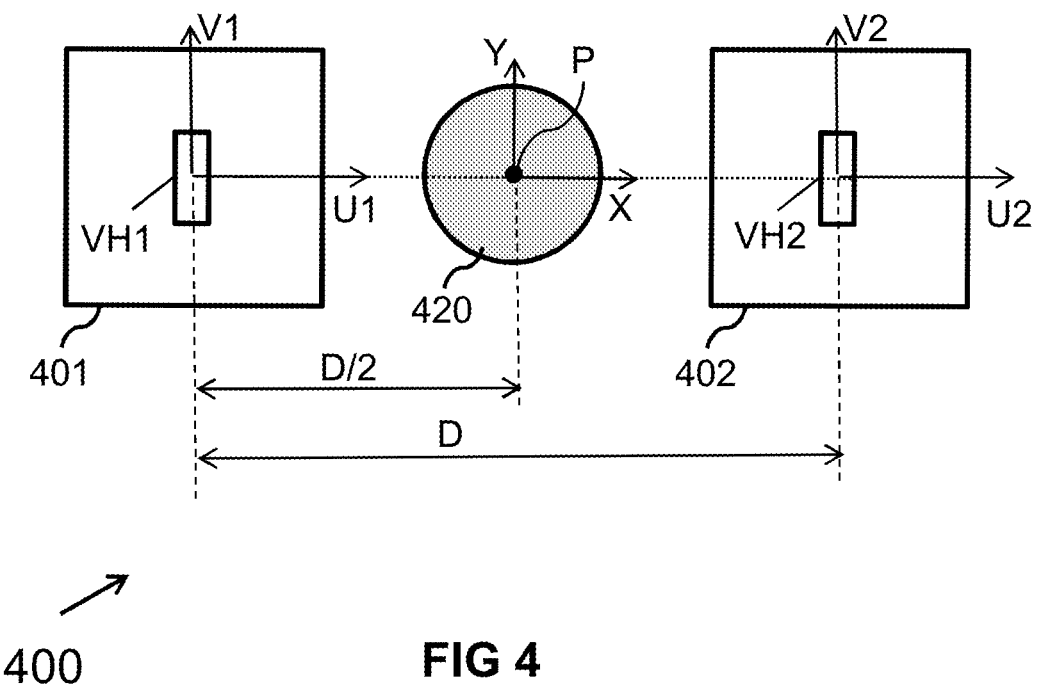
FIG. 4 is a schematic representation of another practical implementation of the system of FIG. 2 according to another embodiment of the present invention, where each sensor comprises a vertical Hall element, adapted for measuring the in-plane magnetic field Bx.

FIG. 4 is a schematic top-view of a possible implementation of a system 400 according to the system of FIG. 2. In the system 400, each sensor 401, 402 comprises a "magnetic sensor element" adapted for measuring the in-plane field component Bx. Various kinds of "magnetic sensor elements" can be used, such as for example a vertical Hall element, or a magnetoresistive sensor (e.g. a Wheatstone bridge of anisotropic magnetoresistive (AMR) or giant magnetoresistive (GMR) or tunneling magneto-resistive (TMR) sensors) sensitive to a magnetic field oriented in the X-direction. The controller, excitation circuitry, readout-circuitry, etc. is not shown in FIG. 4.

Figure 5:
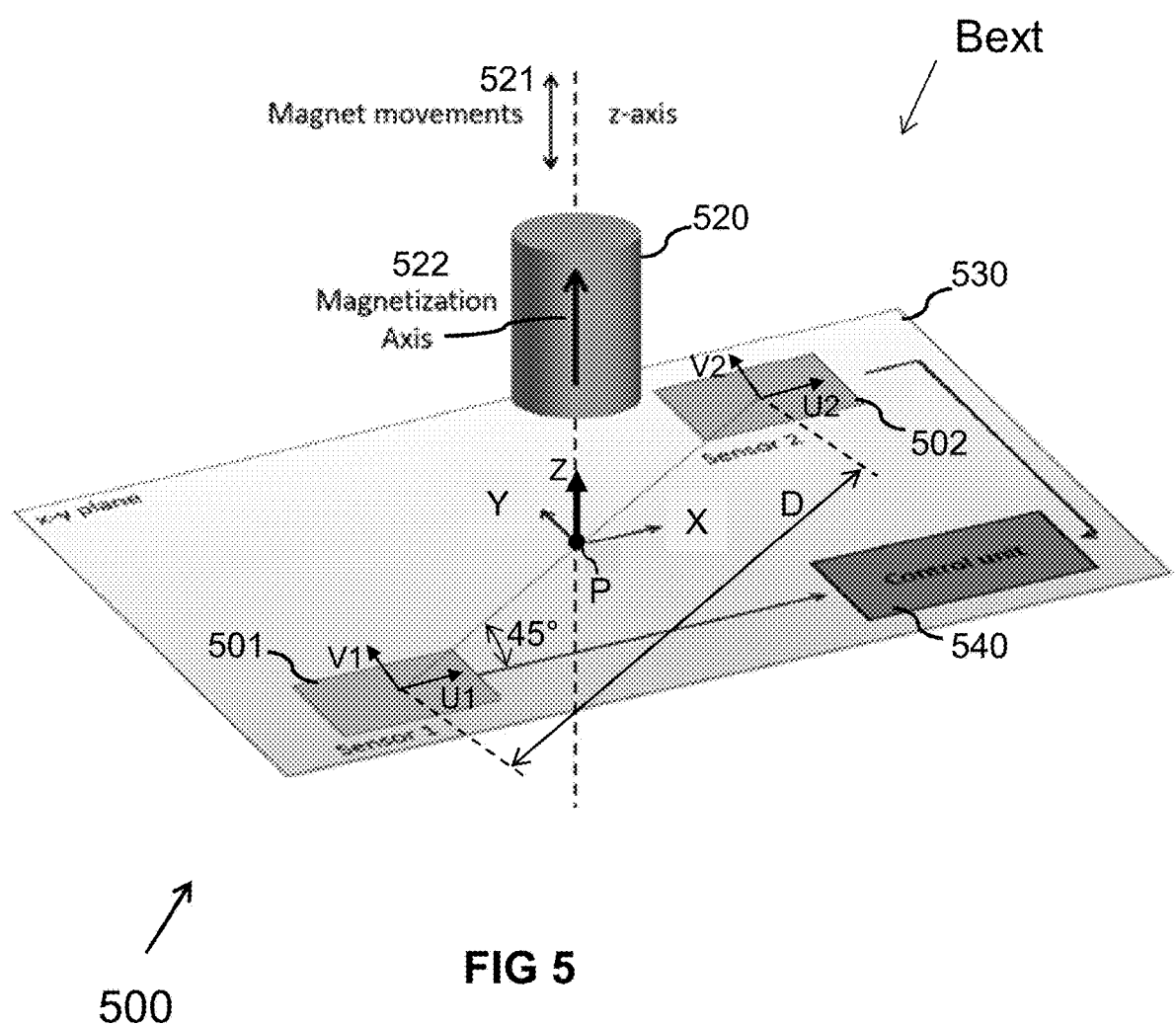
FIG. 5 is a perspective view of another embodiment according to the present invention, using two distinct magnetic sensors, spaced apart over a predefined distance D. The two sensors are oriented such that an intersection point P of the movement axis and the plane containing the sensors lies on a bisector of the internal axes (at 45°).

FIG. 5 is a perspective view of another system 500 according to an embodiment of the present invention, using two distinct magnetic sensors, spaced apart over a predefined distance D. The two sensors 501, 502 are oriented such that an intersection point P of the movement axis 521 and the plane 530 containing the sensors lies substantially on a bisector of the internal axes U1, V1 of the first sensor 501 and U2, V2 of the second sensor 502, or in other words, at 45°. The predefined trajectory 521 over which the magnet 520 can be moved is a straight line 521 substantially perpendicular the plane 530. The first magnetic sensor 501 is adapted for determining a first pair of in-plane magnetic field components, e.g. with respect to an internal axis U1, and with respect to an internal axis V1 perpendicular to U1. The second magnetic sensor 502 is adapted for determining a second pair of in-plane magnetic field components, e.g. with respect to an internal axis U2, and with respect to an internal axis V2 perpendicular to U2. The two sensors 501 and 502 are oriented such that their internal axis U1, U2 and V1, V2 are substantially parallel, but offset from each other. The axis of movement 521 along which the magnet 520 can move is arranged such that an intersection point P of the straight line 521 and the plane 530 in which the sensors are located, is situated substantially halfway between the first magnetic sensor 501 and the second magnetic sensor 502. The intersection point P is located on a bisector of the angle formed by the internal axis U1 and the internal axis V1 of the first sensor, and the intersection point P is located on a bisector of the angle formed by the internal axis U2 and the internal axis V2 of the second sensor.

The controller 540 is a separate component in the system shown in FIG. 5 (but it may also be embedded in one of the sensors), and is adapted for calculating the out-of-plane position Z of the movable magnet as a function of the values Bu1, Bv1 measured by the first sensor, and the values Bu2, Bv2 measured by the second sensor, and the predefined distance D.

More specifically, the position Z can for example be calculated as a function of the value (Bu1−Bu2+Bv1−Bv2)/D, using a look-up table. But as stated above, since the value of D is constant, the position Z can also be calculated using a function of the value (Bu1−Bu2+Bv1−Bv2), using another look-up table which takes into account the value of D.

The system 500 shown in FIG. 5, (referred to herein as "two sensors at 45°") offers redundancy with respect to the system 200 shown in FIG. 2 (referred to herein as "two sensors at 0°") because the value for the gradient in the X-direction and the value for the gradient in the Y-direction should (ideally) be exactly the same, however in practice usually are not. A deviation between these values can be considered as a measure of asymmetry of the system, which may degrade over time. By monitoring this deviation, an error may be detected.

The position Z is preferably calculated based on an average in-plane field gradient, which can be calculated based on the following set of formulas or an equivalent set of formulas:

$$\begin{cases} gradU = \Delta Bu/D = (Bu1 - Bu2)/D & [4] \\ gradV = \Delta Bv/D = (Bu1 - Bu2)/D & [5] \\ Z = f(gradU + gradV) & [6] \end{cases}$$

In the same was as described above, the division by D can be omitted in [4] and [5].

Figure 6:
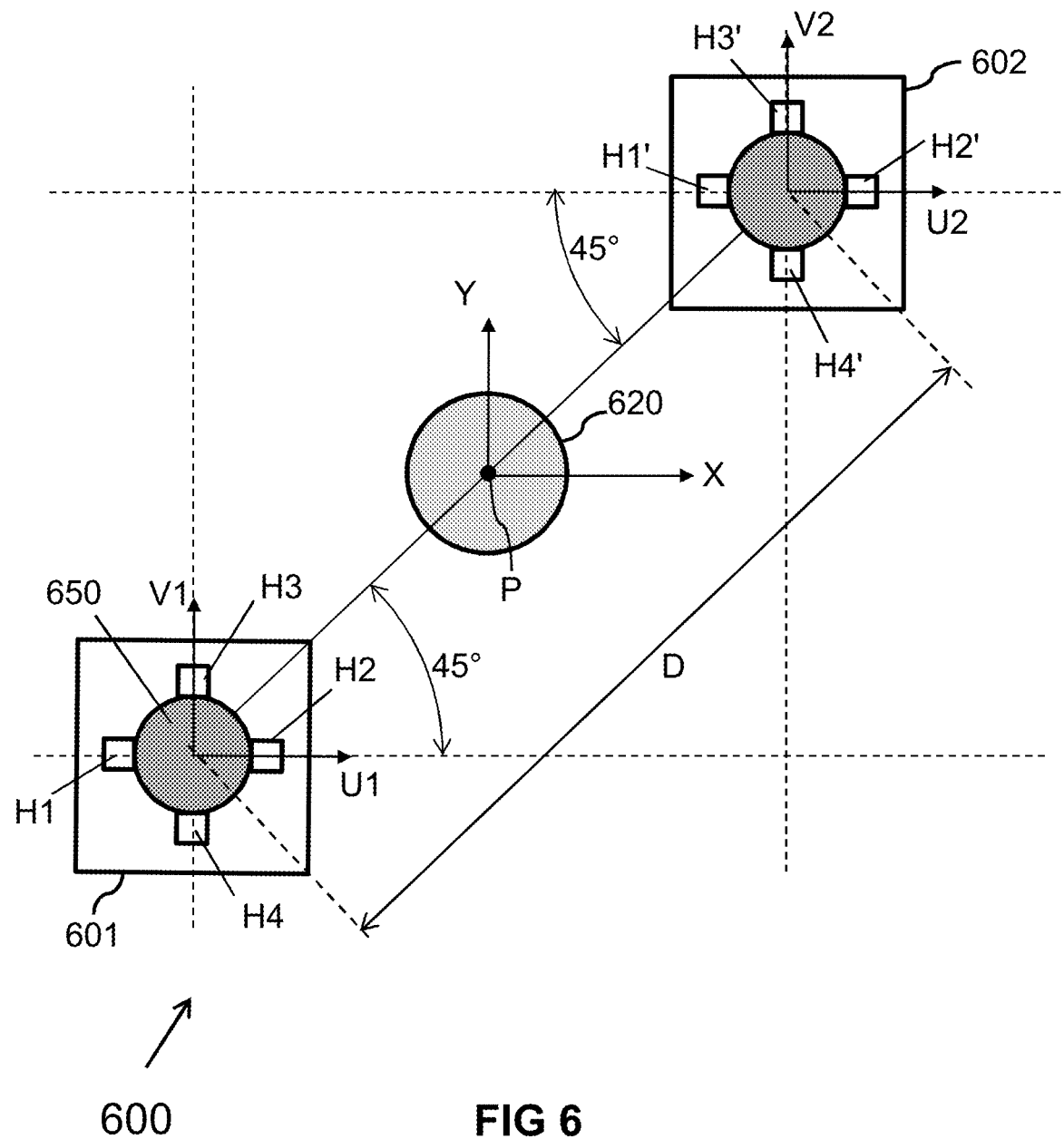

FIG. 6 is a schematic top-view representation of a possible implementation of the system 500 of FIG. 5 according to an embodiment of the present invention. In this embodiment each sensor 601, 602 comprises two pairs of horizontal Hall elements and a disk-shaped IMC, adapted for measuring Bu1 and Bv1 both oriented substantially at 45° with respect to the imaginary line interconnecting the two sensors. The main purpose of this drawing is to show the relative position of the horizontal Hall plates.

Figure 7:
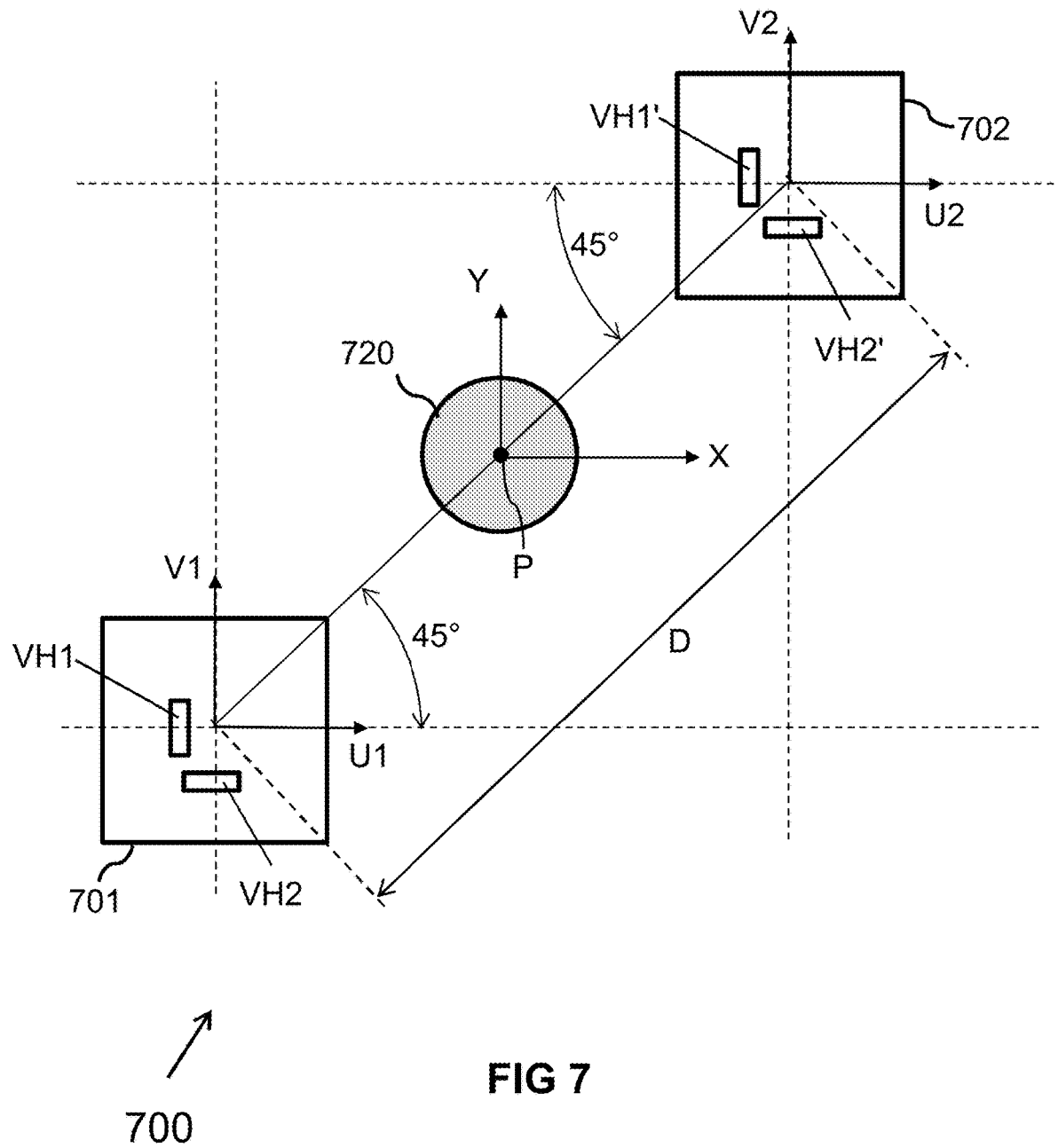

FIG. 7 is a schematic top-view representation of another possible implementation of the system 500 of FIG. 5 according to another embodiment of the present invention. In this embodiment each sensor 701, 702 comprises two vertical Hall elements, adapted for measuring Bu1 and Bv1 both oriented substantially at 45° with respect to the imaginary line interconnecting the two sensors. The main purpose of this drawing is to show the relative orientation of the vertical Hall plates.

But other "magnetic sensor elements" can also be used, such as for example magnetoresistive sensors (e.g. a Wheatstone bridge of anisotropic magnetoresistive (AMR) or giant magnetoresistive (GMR) or tunneling magneto-resistive (TMR) sensors) sensitive to a magnetic field oriented in the U-direction and the V-direction. The controller, excitation circuitry, readout-circuitry, etc. is not shown in FIG. 7 in order not to overload the drawings.

Figure 8A:
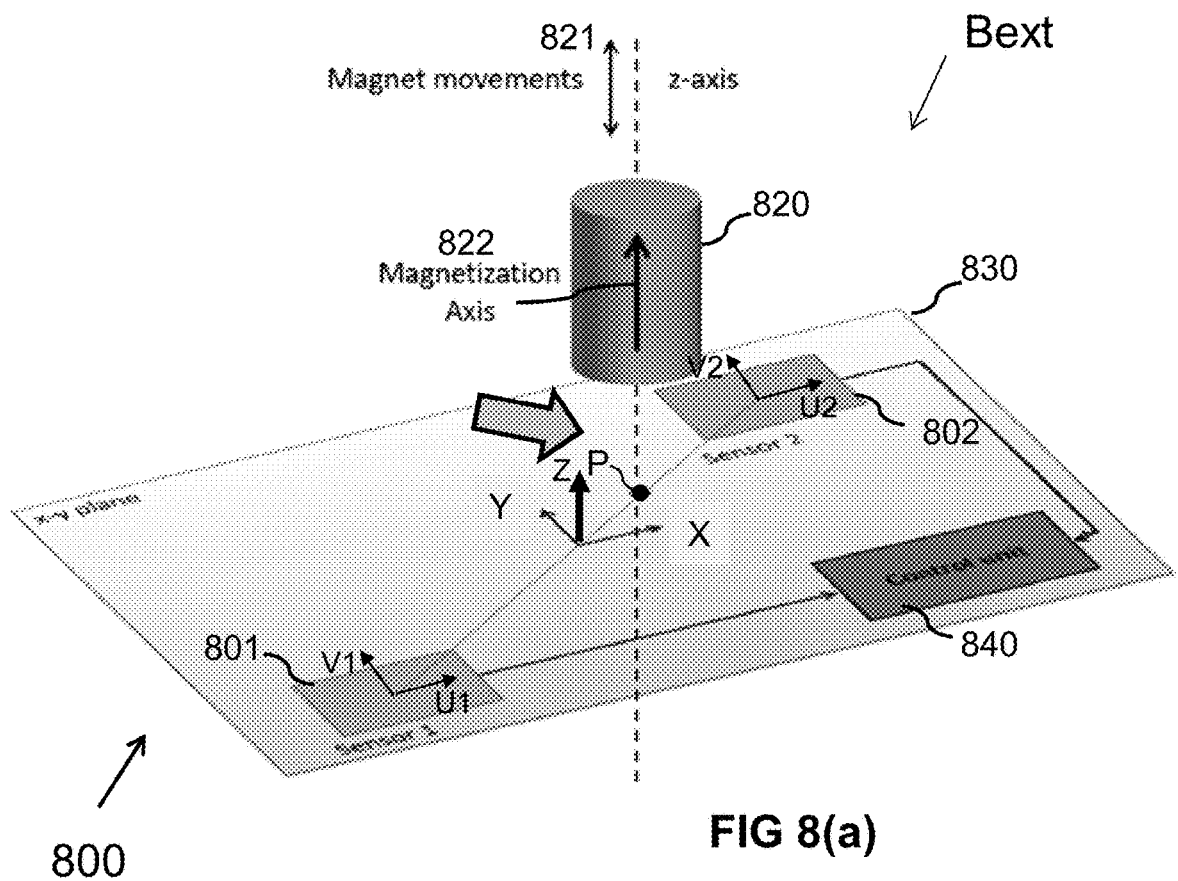
FIGS. 8(a) and 8(b) show a variant of FIG. 5, where the point P is not exactly located in the middle between the two sensors, to illustrate that the system is also highly robust against mounting or assembly tolerances, despite the simple formula.
Figure 8B:
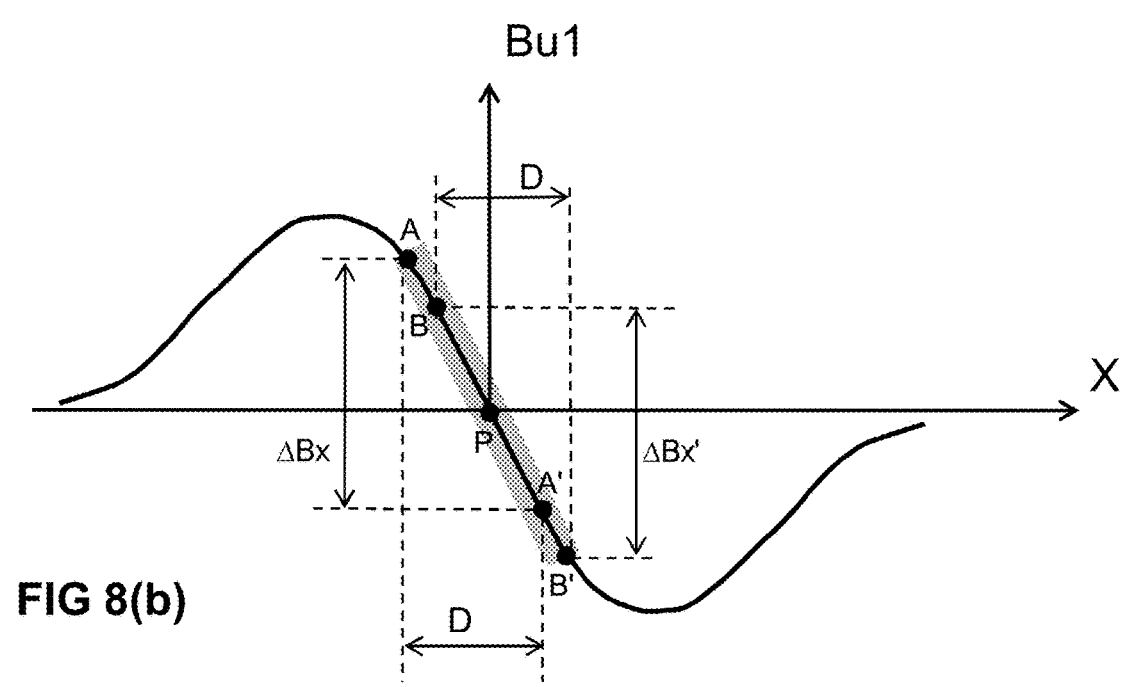

FIG. 8(*a*) shows a variant of FIG. 5, where the point P is located on an imaginary line from the magnetic centre of the first sensor 801 to the magnetic centre of the second sensor 802 but is not located exactly in the middle. The system 800 will still work with the same equations, because a small decrease of one or both of the values provided by the first sensor 801 will completely or largely or at least partially be compensated by a small increase of one or both of the values provided by the second sensor 802, in a manner such that their difference (e.g. if one value is positive and the other value is negative) remains substantially unchanged. Indeed, as can be appreciated from FIG. 8(*b*), the slope ΔBx/D between the points A and A' is substantially the same as the slope ΔBx'/D between the points B and B'.

While not explicitly shown, at least a partial compensation also occurs if the intersection point P is slightly offset from said virtual line. Thus, the system 800 is also highly robust against mounting or assembly tolerances.

Figure 9:
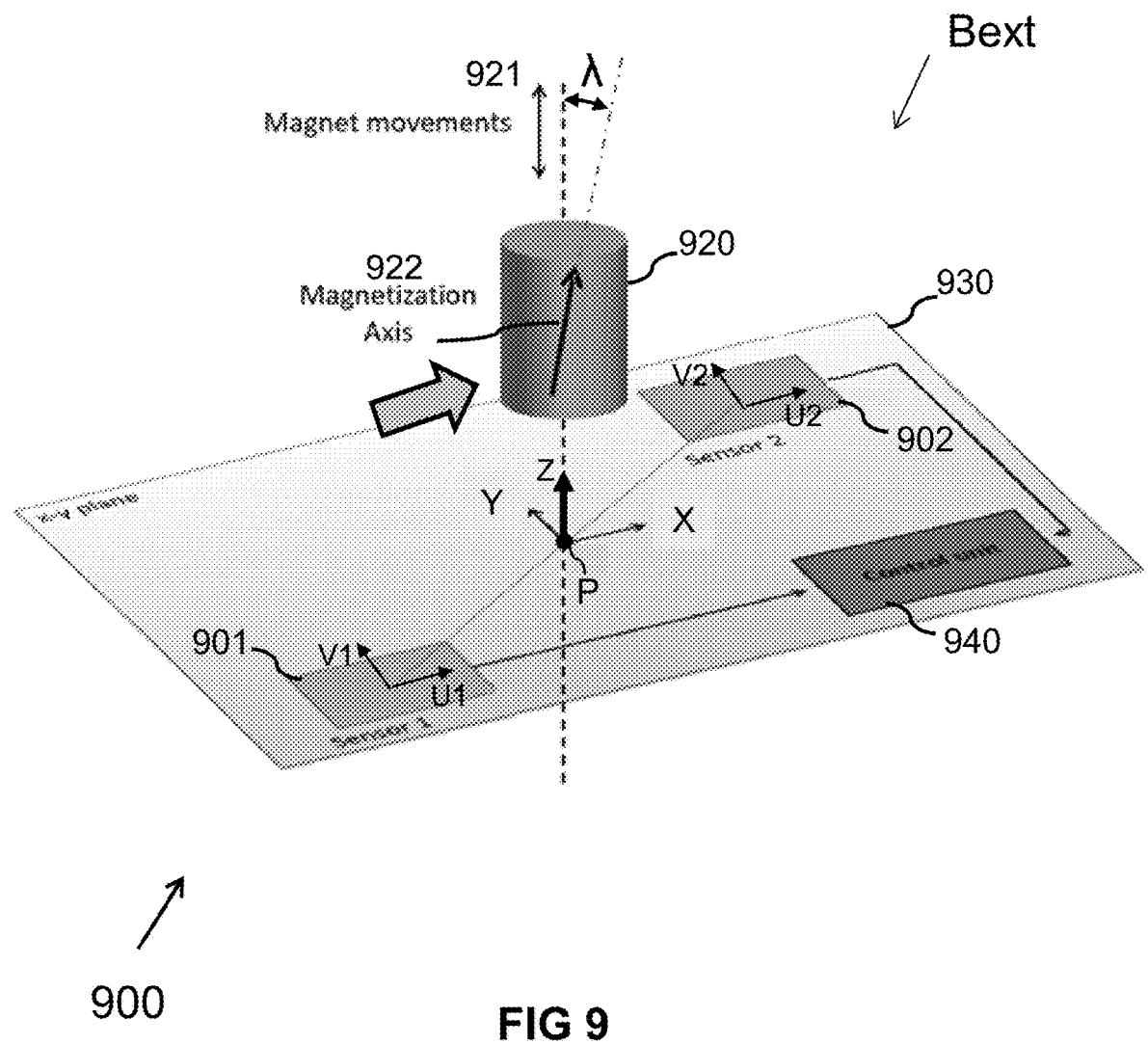
FIG. 9 shows another variant of FIG. 5, where the movement axis is perpendicular to the plane, but the axial magnetization axis is slightly offset from the movement axis, to illustrate that the system is also highly robust against tilting errors of the magnetization axis, despite the simple formula.

FIG. 9 shows another variant of FIG. 5, where the axis of movement 921 is perpendicular to the plane 930, but the magnetization axis 922 of the magnet 920 is slightly tilted with respect to the axis of movement 921. The system 900 will still work with the same equation, because a small decrease of the value(s) provided by the first sensor 901 will be largely compensated by a small increase of the value(s) provided by the second sensor 902, and vice versa, in a manner such that their difference remains substantially unchanged by the tilt angle λ. As can be understood by the skilled person, the same phenomenon also occurs when a perfectly axially magnetized magnet is attached to a movable object (e.g. a knob or button) with a tilt angle λ. Thus, the system 900 is also highly robust against tilting errors of the axis of magnetisation 922 relative to the axis of movement 921.

In a variant (not shown) of the system shown in FIG. 9, the magnetization axis 922 is perfectly parallel to the axis of movement 921, but the axis of movement 921 is not perfectly perpendicular to the plane 930 but is slightly tilted. The same formula also applies for this case, thus the system 900 is also highly robust against tilting errors of the axis of movement 921.

While not explicitly shown, in practice several imperfections may occur simultaneously, such as e.g. the axis of movement 921 not being perfectly linear, and/or the magnetization axis 922 not being oriented perfectly perpendicular to the plane, and/or the intersection point P of the movement axis and the plane not being located exactly halfway between the two sensors 901, 902, etc. but embodiments of the present invention are also relatively insensitive against a combination of such non-idealities.

Figure 10:
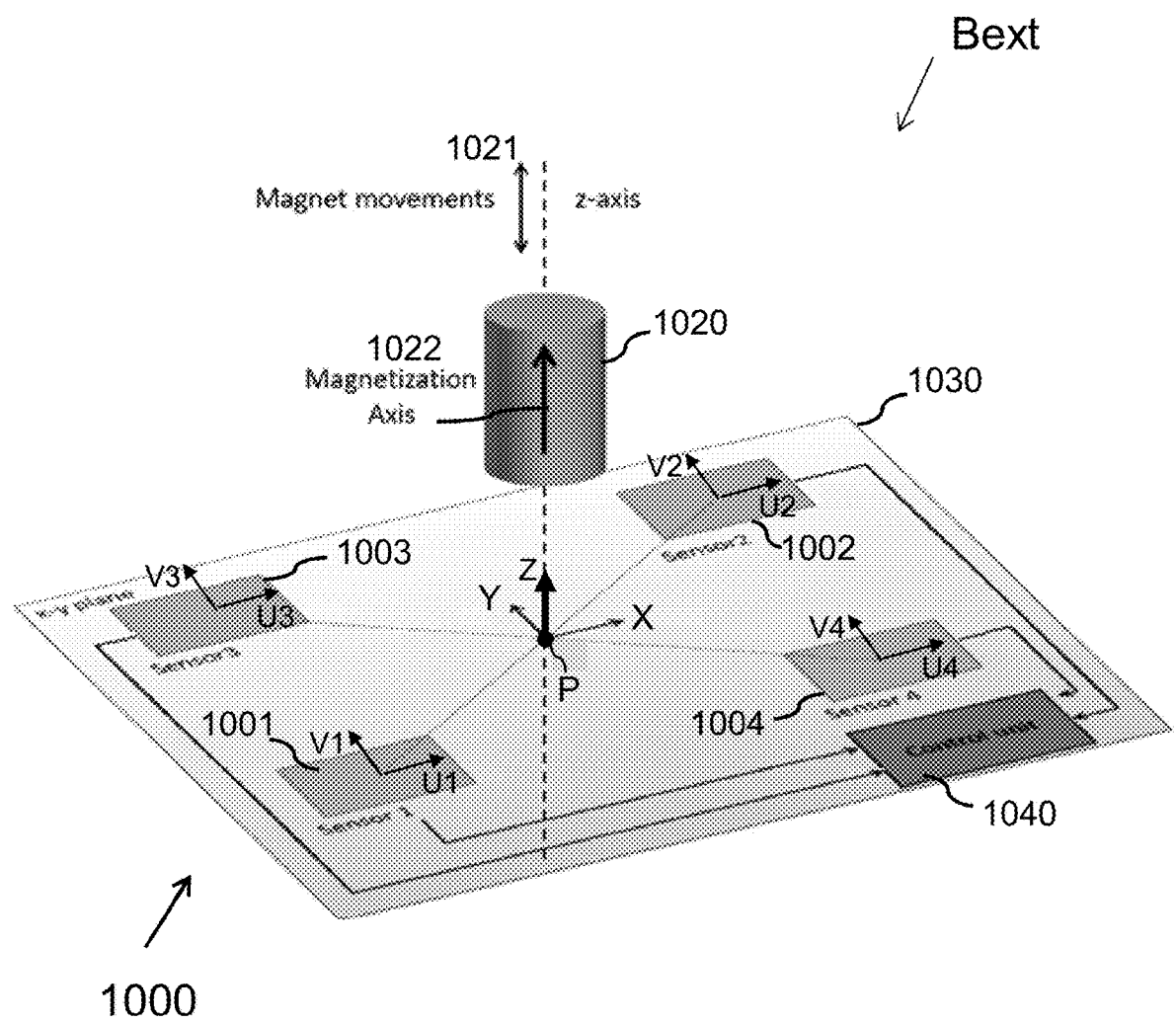
FIG. 10 shows a variant of FIG. 3, comprising four distinct sensors, located on a virtual circle with diameter D, and angularly spaced apart by 90°.

FIG. 10 shows a linear position sensor system 1000 which can be seen as a variant of FIG. 3. The system 1000 comprises four distinct sensors 1001, 1002, 1003, 1004, located on a virtual circle with diameter D, and angularly spaced apart by 90°. The sensors 1001 and 1002 form a first pair. The sensors 1003 and 1004 form a second pair. The four sensors 1001-1004 are located in a plane 1030. Each of the sensors is adapted for providing two values, indicative of magnetic field components in the X-direction and Y-direction, which are parallel to the respective internal U and V-axes, but offset therefrom. The magnet 1020 is movable along a movement axis or straight line 1021 which intersects with the plane 1030 in point P located substantially halfway between the first and second magnetic sensor 1001, 1002, and substantially halfway between the third and fourth magnetic sensor 1003, 1004. The intersection point P is also located on a virtual line forming a bisector of the angle formed by the internal U- and V-axes of each pair of sensors.

The controller 1040, shown here as a separate component, is adapted for calculating the out-of-plane position Z of the movable magnet as a function of the values Bu1, Bv1 obtained from the first sensor 1001, and the values Bu2, Bv2 obtained from the sensor 1002, and the values Bu3, Bv3 obtained from the third sensor 1003, and the values Bu4, Bv4 obtained from the fourth sensor 1004, and the distance D.

The value of the position Z can for example be calculated based on a combination of the eight values obtained from all sensors, for example using the following set of formulas or an equivalent set of formulas:

$$\begin{cases} \text{grad\_avg} = (Bu1 - Bu2 + Bu3 - Bu4 + Bv1 - Bv2 + Bv3 - Bv4)/D & [7] \\ Z = f(\text{grad\_avg}) & [8] \end{cases}$$

As mentioned above, the value D can be omitted from formula [7]. The function of formula [8] can for example be calculated using a look-up table (and optionally also linear interpolation) and/or using a mathematical formula.

But the hardware of FIG. 10 can also be considered as two pairs of a system as shown in FIG. 5, resulting in two values for the position of the magnet 1020, for example a first value Z1 based on the values Bu1, Bv1, Bu2, Bv2 obtained from the sensors 1001 and 1002, and a second value Z2 based on the values Bu3, Bv3, Bu4, Bv4 obtained from the sensors 1003 and 1004, thus yielding two independent values which should be identical. The values Z1 and Z2 can be used for functional safety purposes, for example by using one pair of sensors as the principal pair for measuring the position, and the other pair as a secondary pair for detecting functional malfunction.

In the specific embodiment shown in FIG. 10, there is only one external control unit 1040, but as mentioned above, it is also possible to embed the control unit 1040 in one (or both) of the sensors.

Figure 11:
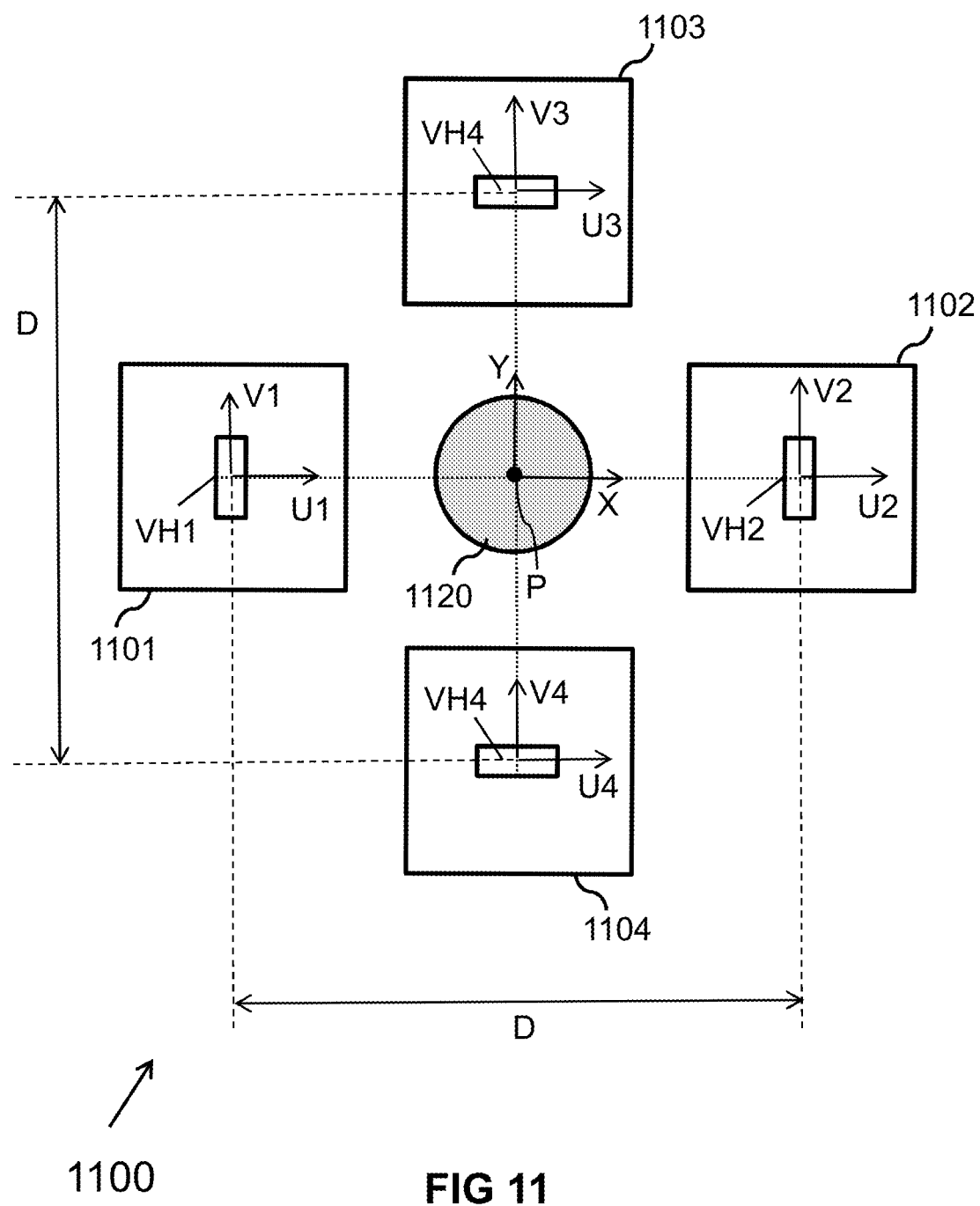
FIG. 11 shows a variant of FIG. 10 and FIG. 4, comprising four distinct sensors, located on a virtual circle with diameter D, and angularly spaced apart by 90°. Each sensor adapted for measuring a radial field component.

FIG. 11 shows a schematic top view of a system which can be considered to be a variant of FIG. 10 or a variant of FIG. 4. The system 1100 comprises four distinct sensors 1101-1104, located on a virtual circle with diameter D, and angularly spaced apart by 90°. Each sensor is adapted for measuring a radially oriented field component.

Similar as in FIG. 10, if the values of the four sensors are combined, a system can be build which is highly robust against a constant stray field and even an external field gradient.

Alternatively, the values obtained from the sensors 1101 and 1102 can be combined to determine a first position Z1, and the values obtained from the sensors 1103 and 1104 can be combined to determine a second position Z2, resulting in two values for the position of the magnet 1120, which can be used for functional safety purposes.

Figure 12:
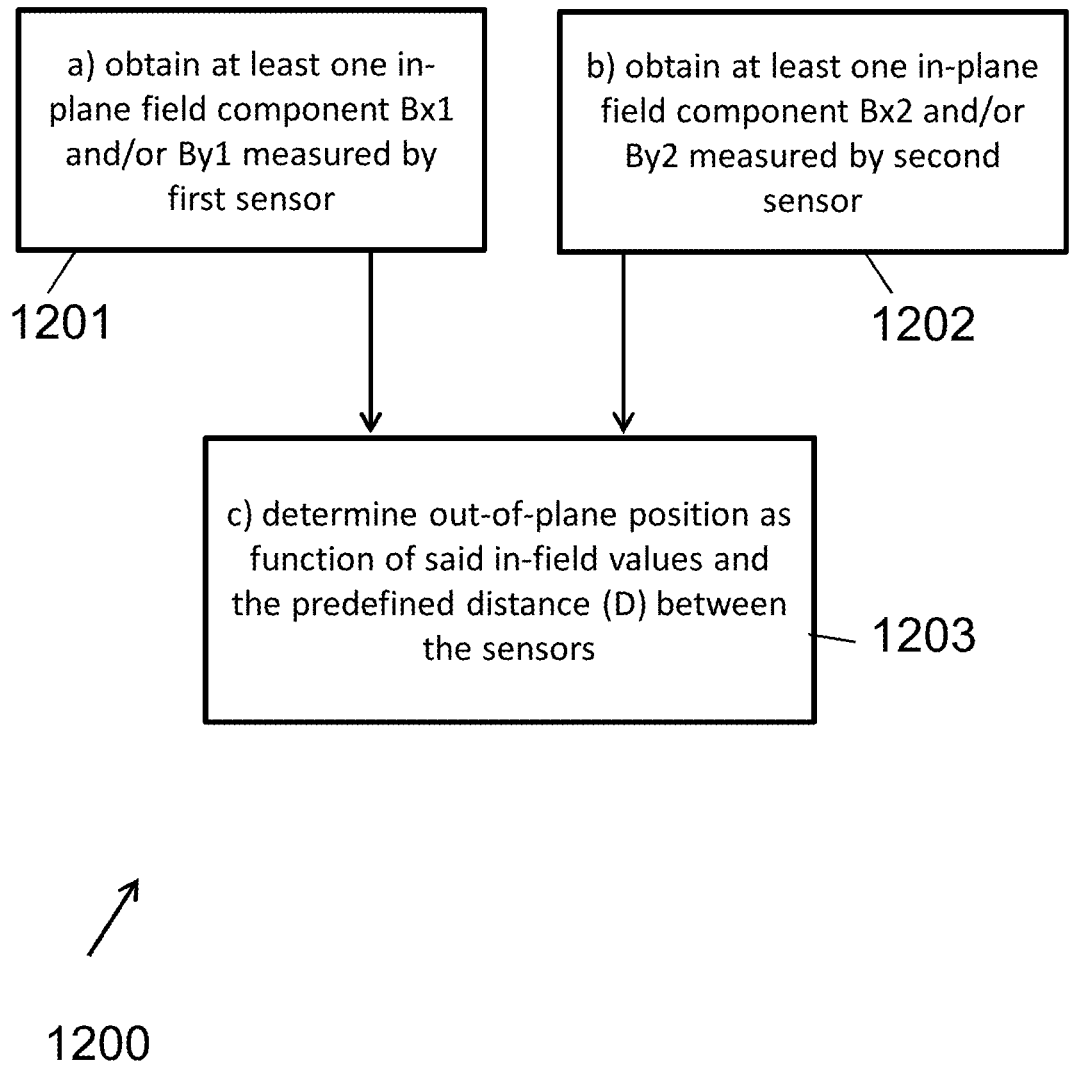
FIG. 12 shows a flow-diagram of a method for determining an out-of-plane position (Z) of an object, based on measurement of at least one in-plane field gradient, according to an embodiment of the present invention.

FIG. 12 shows a flow-diagram of a method 1200 according to an embodiment of the present invention, for determining an out-of-plane position Z of an object, e.g. a permanent magnet or a ferromagnetic target, based on measurement of at least one in-plane field gradient. The method 1200 of FIG. 12 comprises the following steps:

a) obtaining 1201 at least one first value indicative of only one, or at least one in-plane magnetic field component (e.g. Bx1, By1, Bu1, Bv1) from a first sensor;

b) obtaining 1202 at least one second value indicative of only one, or at least one in-plane magnetic field component (Bx2, By2, Bu2, Bv2) from a second sensor;

c) determining 1203 an out-of-plane position Z of said target based on these in-plane field components and on the distance D between the sensors.

Step c) may comprise: determining the out-of-plane position Z as a function of a summation and/or subtraction of said values to obtain a value equal to or proportional to an in-plane field gradient, and using a predefined lookup-table and/or a predefined mathematical formula to convert this field-gradient to an out-of-plane position Z.

In the systems shown above (in FIG. 2 to FIG. 12), the magnet is an axially magnetized cylindrical magnet, but the invention is not limited thereto, and other magnets can also be used, for example:

an axially magnetised disc or cylinder magnet, as shown in FIG. 13, an axially magnetised ring magnet, as shown in FIG. 14.

It is an advantage of using an axially magnetized magnet with a circular cross-section, because the resulting magnetic field is rotation symmetric. The main advantage hereof is that a rotation of the magnet (or object to which the magnet is connected) does not have an influence on the measurement.

But the invention is not limited thereto, and magnets with another cross-section can also be used, for example an axially magnetised block magnet (also called bar magnet) as shown in FIG. 15, or an axially magnetised magnet with a square or hexagonal or octagonal or other suitable cross section (not shown).

The invention claimed is:

1. A position sensor system for measuring a position of a target movable along a predefined trajectory forming a straight line outside a plane, the target being adapted for generating or modifying a magnetic field, the position sensor system comprising:

a first magnetic sensor and a second magnetic sensor, both magnetic sensors fixedly arranged in said plane and spaced apart by a predefined distance, the straight line formed by the predefined trajectory being substantially perpendicular to said plane and an intersection point of the straight line and the plane being located substantially halfway between the first magnetic sensor and the second magnetic sensor;

the first magnetic sensor adapted for measuring a first magnetic field component of said generated or modified magnetic field, oriented in a first direction parallel to said plane;

the second magnetic sensor adapted for measuring a second magnetic field component of said generated or modified magnetic field, oriented in said first direction parallel to said plane; and a controller communicatively connected to the first and the second magnetic sensor and adapted for:

a) determining a magnetic field gradient of said first and said second magnetic field components; and b) determining the out-of-plane position of said target along said straight line as a function of said magnetic field gradient.

2. A position sensor system according to claim 1, wherein the second magnetic sensor is distinct from the first magnetic sensor.

3. A position sensor system according to claim 1, wherein step b) comprises: using a predefined lookup-table or using a predefined mathematical formula.

4. A position sensor system according to claim 1, wherein the target is an axially magnetized permanent magnet; and
wherein an axial magnetization direction is substantially parallel with the straight line.

5. A position sensor system according to claim 1, wherein the predefined distance is a value in a range from 5 mm to 50 mm.

6. A position sensor system according to claim 1, wherein the first magnetic sensor is a first packaged semiconductor device and the second magnetic sensor is a second packaged semiconductor device different from the first packaged semiconductor device; and
wherein the first and the second sensor device are mounted on a printed circuit board defining said plane.

7. A position sensor system according to claim 1,
wherein the first magnetic sensor is adapted for determining only a first magnetic field component along a first internal axis; and
wherein the second magnetic sensor is adapted for determining only a second magnetic field component along a third internal axis; and
wherein the first internal axis and the third internal axis substantially coincide; and
wherein the controller is adapted for calculating the out-of-plane position of the movable target based on a value Bu1−Bu2, wherein Bu1 is the first magnetic field component and Bu2 is the second magnetic field component.

8. A position sensor system according to claim 7, further comprising a third magnetic sensor and a fourth magnetic sensor;
wherein the third magnetic sensor is adapted for determining only a third magnetic field component along a fifth internal axis; and
wherein the fourth magnetic sensor is adapted for determining only a fourth magnetic field component along a sixth internal axis; and
wherein the fifth internal axis and the sixth internal axis substantially coincide and are perpendicular to the first internal axis; and
wherein said intersection point is located substantially halfway between the third magnetic sensor and the fourth magnetic sensor; and
wherein the controller is operatively connected to the third and the fourth magnetic sensor, and is adapted for calculating the out-of-plane position of the movable target as a function of the first magnetic field component, the second magnetic field component, the third magnetic field component and the fourth magnetic field component and the predefined distance.

9. A position sensor system according to claim 1,
wherein the first magnetic sensor is adapted for determining a first pair of magnetic field components along a first internal axis and a second internal axis perpendicular to the first internal axis; and
wherein the second magnetic sensor is adapted for determining a second pair of magnetic field components along a third internal axis and a fourth internal axis perpendicular to the third internal axis; and
wherein the first internal axis and the third internal axis are substantially parallel; and
wherein the intersection point is located on a bisector of a first angle formed by the first internal axis and the second internal axis; and
wherein the intersection point is located on a bisector of a second angle formed by the third internal axis and the fourth internal axis; and
wherein the controller is adapted for calculating the out-of-plane position of the movable target as a function of a value Bu1−Bu2+Bv1−Bv2, wherein Bu1, Bu2, Bv1 and Bv2 are the first, the second, the third and the fourth magnetic field components, respectively.

10. A position sensor system according to claim 9, further comprising:
a third magnetic sensor and a fourth magnetic sensor, both distinct from the first and the second magnetic sensor, and fixedly arranged in said plane, the fourth magnetic sensor located at said predefined distance from the third magnetic sensor;
the third magnetic sensor adapted for measuring a third pair of magnetic field components of said generated or modified magnetic field in said plane;
the fourth magnetic sensor adapted for measuring a fourth pair of magnetic field components of said generated or modified magnetic field in said plane;
wherein an intersection point of the straight line and the plane is located substantially halfway between the first magnetic sensor and the second magnetic sensor; and
wherein the intersection point is also located substantially on a bisector of an angle formed by internal axes of the third magnetic sensor;
wherein the intersection point is also located substantially on a bisector of an angle formed by internal axes of the fourth magnetic sensor;
wherein the controller is adapted for calculating the out-of-plane position of the movable target as a function of values Bu1, Bv1, Bu2, Bv2, Bu3, Bv3, Bu4, Bv4 of the first, the second, the third and the fourth pairs of magnetic field components, respectively, and the predefined distance.

11. A computer implemented method for determining an out-of-plane position of the target along the straight line of a position sensor system according to claim 1, the method comprising:
a) measuring, by the first magnetic sensor, the first magnetic field component oriented in said first direction parallel to the plane;
b) measuring, by the second magnetic sensor, the second magnetic field component oriented in said first direction parallel to the plane;
c) determining a magnetic field gradient of the first and the second magnetic field components;
d) determining the out-of-plane position as a function of said magnetic field gradient.

12. A computer implemented method according to claim 11, wherein step c) comprises: determining the magnetic field gradient by summing or subtracting said first and said second magnetic field components;
and wherein step d) comprises: determining the out-of-plane position using a predefined lookup-table and/or a predefined mathematical formula.

* * * * *